(12) United States Patent
Krishnan et al.

(10) Patent No.: US 8,943,060 B2
(45) Date of Patent: Jan. 27, 2015

(54) SYSTEMS, METHODS AND APPARATUS FOR IDENTIFYING LINKS AMONG INTERACTIONAL DIGITAL DATA

(75) Inventors: Bharath K. Krishnan, Lexington, MA (US); Vishwamitra S. Ramakrishnan, Belmont, MA (US)

(73) Assignee: Cquotient, Inc., Cambridge, MA (US)

( * ) Notice: Subject to any disclaimer, the term of this patent is extended or adjusted under 35 U.S.C. 154(b) by 0 days.

(21) Appl. No.: 13/407,393

(22) Filed: Feb. 28, 2012

(65) Prior Publication Data

US 2013/0226920 A1    Aug. 29, 2013

(51) Int. Cl.
*G06F 17/30*    (2006.01)
*G06Q 30/02*    (2012.01)
*G06Q 20/40*    (2012.01)
*G06Q 50/26*    (2012.01)

(52) U.S. Cl.
CPC .......... *G06F 17/30598* (2013.01); *G06Q 30/02* (2013.01); *G06Q 20/4014* (2013.01); *G06Q 30/0204* (2013.01); *G06F 17/30705* (2013.01); *G06Q 50/265* (2013.01)
USPC .......................................................... 707/737

(58) Field of Classification Search
CPC ..................... G06F 17/30705; G06F 17/30598
USPC .......................................... 707/758, E17.009
See application file for complete search history.

(56) References Cited

U.S. PATENT DOCUMENTS

| | | | | |
|---|---|---|---|---|
| 5,794 | A * | 9/1848 | Crum ............................. | 470/10 |
| 5,813,003 | A * | 9/1998 | Chen et al. ..................... | 1/1 |
| 5,943,667 | A * | 8/1999 | Aggarwal et al. .............. | 1/1 |
| 6,766,327 | B2 * | 7/2004 | Morgan et al. ................. | 1/1 |
| 7,657,540 | B1 * | 2/2010 | Bayliss ...................... | 707/999.1 |
| 7,725,423 | B1 * | 5/2010 | Pricer .......................... | 1/1 |
| 8,200,640 | B2 * | 6/2012 | Arasu et al. .................. | 707/692 |
| 8,438,183 | B2 * | 5/2013 | Scriffignano et al. ........ | 707/780 |
| 8,510,323 | B2 * | 8/2013 | Eshwar et al. ............... | 707/765 |
| 2002/0124015 | A1 * | 9/2002 | Cardno et al. ............... | 707/204 |
| 2005/0234913 | A1 * | 10/2005 | Carone et al. ................. | 707/9 |
| 2007/0100680 | A1 * | 5/2007 | Kumar et al. ................. | 705/10 |
| 2008/0140602 | A1 * | 6/2008 | Roth et al. ................... | 706/59 |
| 2008/0319829 | A1 * | 12/2008 | Hunt et al. ................... | 705/10 |
| 2009/0106242 | A1 * | 4/2009 | McGrew et al. ............. | 707/6 |

(Continued)

FOREIGN PATENT DOCUMENTS

WO        WO 0068860 A2 * 11/2000
WO        WO 2011095776 A1 * 8/2011

OTHER PUBLICATIONS

Chen, Z. et al. (Jun. 2005). Exploiting relationships for object consolidation. In Proceedings of the 2nd international workshop on Information quality in information systems (pp. 47-58). ACM.*

(Continued)

*Primary Examiner* — Jason Liao
*Assistant Examiner* — Jesse P Frumkin
(74) *Attorney, Agent, or Firm* — Nutter McClennen & Fish LLP; David J. Powsner

(57) ABSTRACT

The invention provides in some aspects methods of digital data processor-based analysis of digital data that represent interactions to identify distinct individuals and/or the entities with which they are affiliated (e.g., households, businesses, social or other groups) involved in those interactions. The methods can be employed, for example, to analyze digital data representing retail purchase, marketing and visitor interactions for tracking and/or reporting purposes.

26 Claims, 4 Drawing Sheets

(56) References Cited

U.S. PATENT DOCUMENTS

| | | | |
|---|---|---|---|
| 2009/0132347 A1* | 5/2009 | Anderson et al. | 705/10 |
| 2009/0144122 A1* | 6/2009 | Ginsberg et al. | 705/10 |
| 2010/0077006 A1* | 3/2010 | El Emam et al. | 707/785 |
| 2010/0082445 A1* | 4/2010 | Hodge et al. | 705/21 |
| 2010/0153174 A1* | 6/2010 | Angell et al. | 705/10 |
| 2010/0161603 A1* | 6/2010 | Caceres | 707/736 |
| 2010/0332537 A1* | 12/2010 | El Emam et al. | 707/771 |
| 2011/0078762 A1* | 3/2011 | Bijlsma | 726/3 |
| 2011/0231227 A1* | 9/2011 | Temares et al. | 705/7.33 |
| 2011/0258206 A1* | 10/2011 | El Emam et al. | 707/754 |
| 2011/0258232 A1* | 10/2011 | Scriffignano et al. | 707/780 |
| 2012/0054213 A1* | 3/2012 | Puttaswamy et al. | 707/758 |
| 2012/0173537 A1* | 7/2012 | Shaffer et al. | 707/741 |
| 2012/0226590 A1* | 9/2012 | Love et al. | 705/30 |
| 2012/0254242 A1* | 10/2012 | Kanagasabapathi et al. | 707/776 |
| 2012/0290580 A1* | 11/2012 | Cao et al. | 707/737 |

OTHER PUBLICATIONS

Nelson, S. et al. (2001). Customer Data Quality and Integration: The Foudation of Succesful CRM. Gartner Group report seriesGartner, London.*

Malik, L. G. (Jun. 2011) Generating Customer Profiles for Retail Stores Using Clustering Techniques. International Journal on Computer Science and Engineering (IJCSE). pp. 2506-2510.*

Schraml, Todd (Apr. 2000) I buy, therefore I am. Intelligent Enterprise. pp. 46-52.*

Sauleau, E. A., et al. (2005). Medical record linkage in health information systems by approximate string matching and clustering. BMC Medical Informatics and Decision Making, 5(1), 32.*

Nin, J., Muntes-Mulero, V., et al. (Sep. 2007). On the use of semantic blocking techniques for data cleansing and integration. In Database Engineering and Applications Symposium, 2007. IDEAS 2007. 11th International (pp. 190-198). IEEE.*

Jiang, T., et al. (2006). Segmenting customers from population to individuals: Does 1-to-1 keep your customers forever?. Knowledge and Data Engineering, IEEE Transactions on, 18(10), 1297-1311.*

Monz (Monz, Chrisof, Machine Learning for Data Mining: Week 10: Association Analysis, Accessed through the Internet Archive: https://web.archive.org/web/20110516082929/http://www.eecs.qmul.ac.uk/~christof/html/courses/ml4dm/week10-association-4pp.pdf; Archive accessed on Apr. 21, 2014; document stored on Archive on May 16, 2011).*

Mining Your Own Business in Retail Using DB2 Intelligent Miner for Data an IBM Redbook Publication IBM Redbook Form No. SG24-6271-00 ISBN: 0738422940 ISBN: 9780738422947.*

International Search Report and Written Opinion mailed Mar. 29, 2013 for Application No. PCT/US2013/25735 (7 Pages).

McCallum et al., Object consolodation by graph partitioning with a conditionally-trained distance metric. KDD Workshop on Data Cleaning, Record Linkage and Object Consolidation (SIGKDD). 2003, 6 pages.

Prasad et al., Generating customer profiles for retail stores using clustering techniques. International Journal on Computer Science and Engineering (IJCSE). 2011;3(6):2506-2510.

* cited by examiner

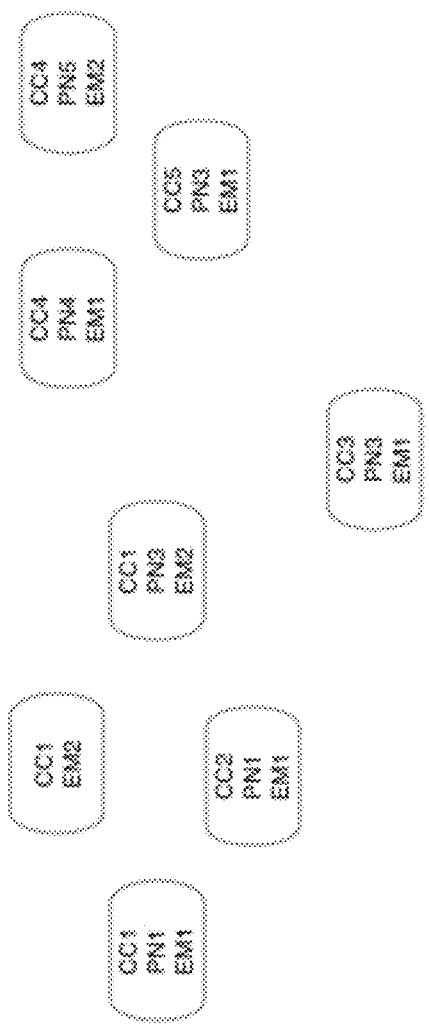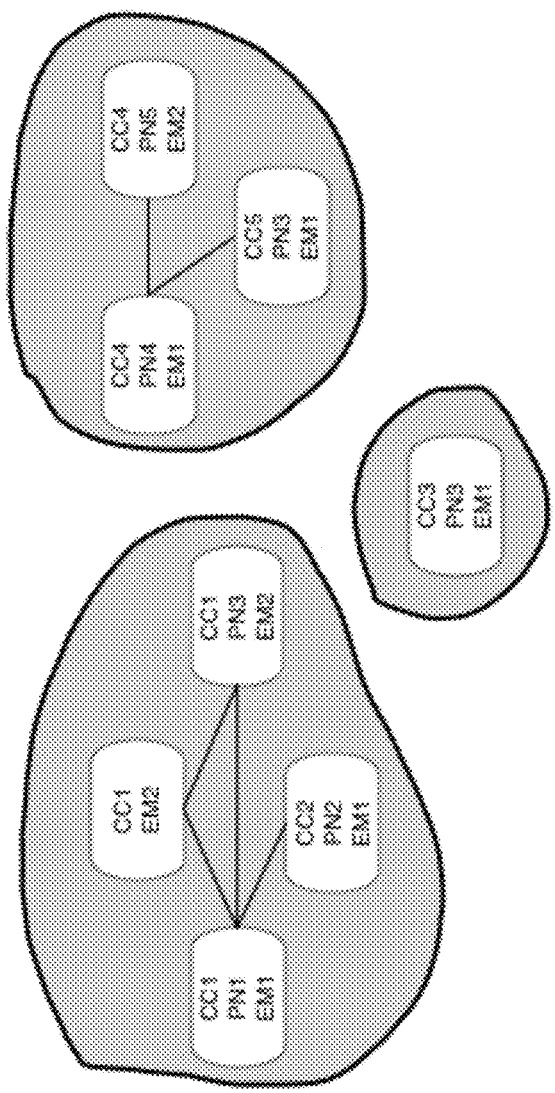

SYSTEMS, METHODS AND APPARATUS FOR IDENTIFYING LINKS AMONG INTERACTIONAL DIGITAL DATA

BACKGROUND OF THE INVENTION

The invention pertains to digital data processing and, more particularly, to methods of analyzing digital data representing interactions to identify those involving distinct individuals and/or the entities with which they are affiliated (e.g., households, businesses, social or other groups).

The invention has application, by way of non-limiting example, in identifying among data records reflecting interactions between, say, a retailer and the public, those records reflecting interactions with a given person and/or his or her household, business or social colleagues—regardless of whether those interactions are in the retailer's brick-and-mortar stores, through the mails, over cyberspace or otherwise.

The invention also has application, by way of further non-limiting example, in identifying such interactions in which a common device—such as, for example, an NFC-enabled mobile phone—is utilized, e.g., by an individual, a household member or colleague when visiting a retailer's brick-and-mortar store, browsing its websites, etc.

Tracking, analyzing and reporting interactions between an individual and an entity can be difficult. Take the case of interactions with a retailer and, specifically, for example, purchases made by the individual from a large retailer. The individual might use checks for some transactions at the retailer's brick-and-mortar stores, yet, cash for others. Identifying information gleaned from checks and stored to the retailer's back office databases, along with records of the attendant purchases, can be useful in targeting subsequent adverts to the individual. However, no such information is typically available for the cash purchases—which, for all intents and purposes, are anonymous—and, hence, cannot be taken into account in the targeting the buyer.

The problem is compounded by the retailer's web sites and call centers, since payments by the individual to these may be by still other means (e.g., credit card, Paypal, etc.). While information gleaned from those transactions might be useful in targeting advertising to the buyer in connection with his or her online purchases, it may be difficult to match with information about in-store purchases.

And, as if correlating various purchases made by an individual were not hard enough, worse still is associating them with the broader class of interactions he/she may have with the retailer. Interactions which may include, for example, visits by the individual to the retailer's sites in the real or cyber worlds; customer service calls and other contacts (e.g., carry-in and in-home repairs); personalized mailings, whether in paper or electronic; and, mass-media marketing campaigns in newspapers, television, radio, or billboards in his/her area.

Extend this to groups or organizations of which the individual is a member—say, his/her household, company, or social clubs—and the problem is more difficult. In the case of interactions between a retailing entity and members of a household, for example, touch points may differ in time, place and nature. Likewise, interactions with actual and potential corporate purchasers may come from any of a diverse number of employees, as well as from the purchasing or other department(s). Those with members of a common house of worship and other social organization may be still more extenuated.

Of course, these problems are not limited to retailers. Other for-profit entities, from manufacturers to publishers, as well as nonprofits and even governmental organizations face difficulty, too, in tracking, analyzing and reporting interactions with individuals, households, social groups, etc.—whether for customizing fund-raising (e.g., in the case of nonprofits), gauging market trends and the impact of marketing (e.g., in the case of for-profits) and understanding needs of their constituencies (e.g., in the case of governmental entities).

In an attempt to get a better handle on this, many entities employ a manual or electronic registration log, asking visitors to sign in with identifying and residence information, identification cards, user IDs, or the like before every interaction. Retailers have their own form of these, namely, loyalty cards—but, more traditionally, they rely on identifying data collected at the time of sale. Examples are credit card account numbers, discount numbers, phone numbers and so forth. Thus, for example, a retailer seeking to launch a targeted ad campaign at households might cull its retail transaction database by credit card number, using purchases made under each separate number to drive customized paper mailings, e-mailings, and so forth.

Unfortunately, attributes collected in registration logs, at point of sale and the like are not always accurate. In retailing, this can be accidental or due to willful action on the part of the customer who provides the information and/or the cashier or salesperson who records it. For example, the head of a household might mistakenly give an office phone number—or, perhaps, an apocryphal phone number—when making a purchase for the household. By way of further example, a cashier may enter his or her own air miles account number in order to get personal credit for a purchase by a customer.

Moreover, even those attributes that are accurately recorded can be over- and under-inclusive when it comes to distinguishing buying groups. Thus, while most members of a household might rely on a single credit card in making a majority of purchases, the head of the household may use any of several different credit cards, thus, blurring efforts to tie all of those purchases back to the same family. On the other end of the spectrum, purchases made under a discount code assigned to a club may imply relationships between purchasers and purchases that, in fact, do not exist.

In view of the foregoing, an object of the invention is to provide improved systems, apparatus and methods of digital data processing and, particularly, for example, of analyzing data representing interactions to identify those with a particular individual and/or the household, business, social or other group to which he/she belongs.

A related object is to provide such systems, apparatus and methods as facilitate identifying, among data records reflecting interactions between the public and a for-profit, nonprofit, governmental or other entity, those records reflecting interactions with given individual and/or an entity with which he/she is affiliated, whether that is a household, business or social group. A further related object of the invention is to provide such systems, apparatus and methods as facilitate identifying those records, regardless of whether the underlying interactions occur in the real world, in cyberspace or otherwise.

A further related object of the inventions is to provide such systems, apparatus and methods as can be applied in identifying purchase transactions between a retailing entity and an individual and/or her/her family, business or social colleagues.

A related object is to provide such methods as facilitate identifying such interactions notwithstanding errors in, for example, email addresses, phone numbers, air miles account numbers, etc., provided in connection with the transactions.

BRIEF DESCRIPTION OF THE ILLUSTRATED EMBODIMENT

A more complete understanding if the invention may be attained by reference to the drawings, in which:

FIG. 4 depicts the grouping of data through operation of the software application of FIG. 3.

SUMMARY OF THE INVENTION

Figure 1:
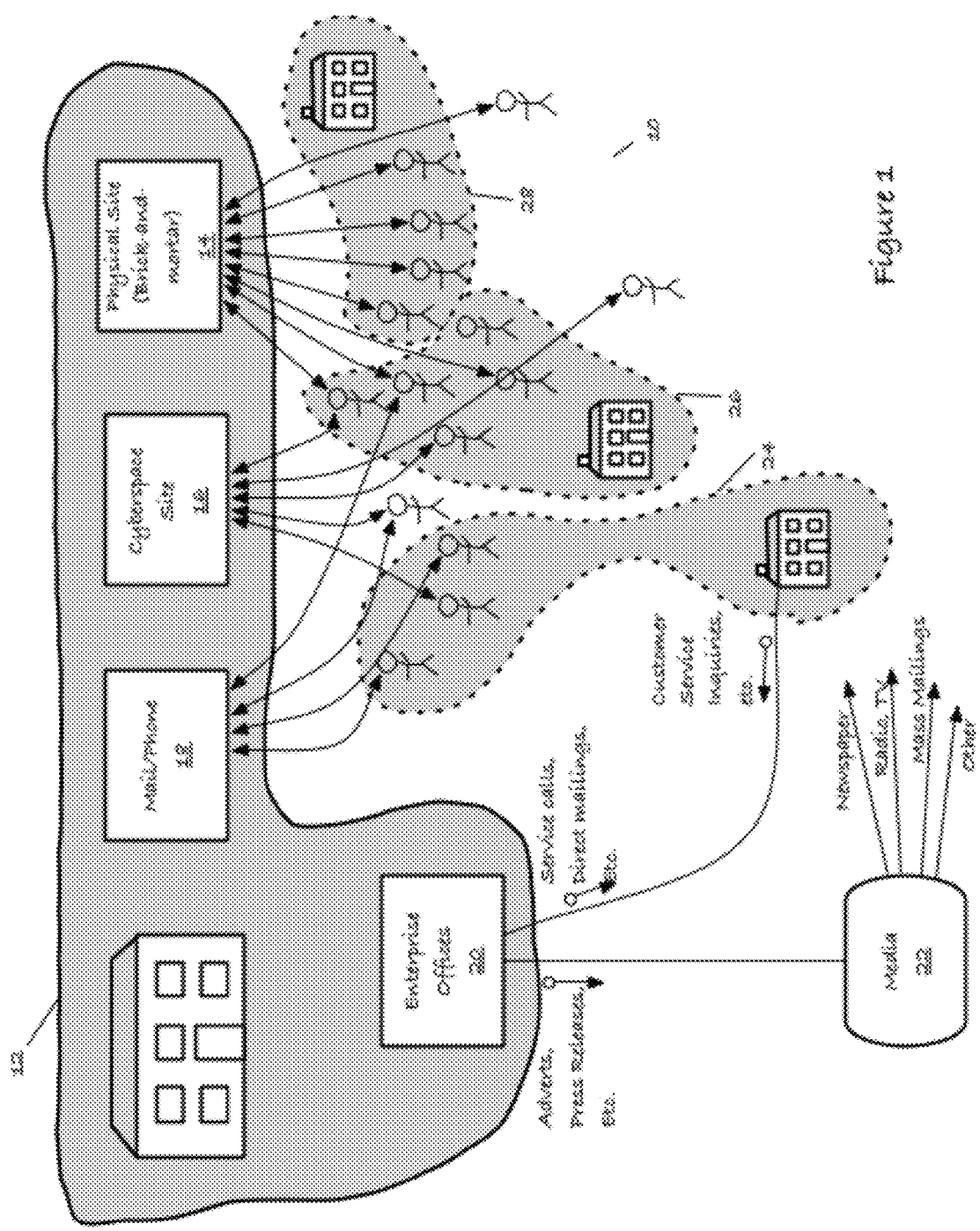
FIG. 1 depicts a use case for systems and methods according to the invention.

The foregoing are among the objects attained by the invention, which provides in some aspects methods of digital data processor-based analysis of digital data that represent interactions to identify distinct individuals and/or the entities with which they are affiliated (e.g., households, businesses, social or other groups). The methods can be employed, for example, to analyze retail purchases, marketing and visitor data to identify households or other related buying groups for tracking and/or reporting purposes.

Related aspects of the invention provide such methods, e.g., as described above, that identify attributes (e.g., specific phone numbers, specific user IDs, etc.) associated with those interactions—and, particularly, with the data records representing those interactions—which tend to reliably demarcate the distinct individuals and/or the entities with which those individuals are affiliated.

Further aspects of the invention provide such methods, e.g., as described above, as comprise utilizing a digital data processing system to group data representing a plurality of interactions into tentative groups ("data blobs") based on one or more predesignated attributes—i.e., on attributes presumed to reliably characterize distinct individuals and/or the entities with which they are affiliated—such as, for example, specific credit card account numbers, specific email addresses, specific ship-to addresses, specific travel-related mileage account numbers, and so forth.

Related aspects of the invention provide such methods in which the grouping step comprises utilizing the digital data processing system to include in each data blob those interactions associated with one or more of the predesignated attributes. For example, in embodiments where the predesignated attributes are email addresses and credit card account numbers, the grouping step includes utilizing the digital data processing system to form into respective data blobs all transactions associated with the same email addresses and/or the same credit card account numbers.

Methods according to these aspect of the invention further comprise utilizing the digital data processing system to newly designate, among the other attributes associated with the interactions—i.e., among attributes other than the predesignated ones—those attributes tending, de facto, to reliably demarcate distinct individuals and/or the entities with which they are affiliated.

Related aspects of the invention provide such methods in which the designating step comprises utilizing the digital data processing system to identify, among those other attributes, those (i) whose quantitative usage among the data blobs does not exceed a first threshold measure, and (ii) which are of a type for which a quantitative measure of reliability does not exceed a second threshold measure in any data blobs in which the attribute appears.

For example, in embodiments where the other attributes include phone numbers, this step includes identifying specific phone numbers that do not appear among an excessive number of data blobs and that, within the data blobs with which they do appear, are not of a type (here, the attribute type "phone number") for which many different values appear relative the distinct combinations of predesignated attributes associated with the records of that data blob.

The aforesaid methods can further include utilizing the digital data processing system to re-group interactions represented by the data into refined groupings of interactions based on at least one of the newly designated attributes and/or assigning unique identifiers to such refined groupings. In related aspects, those refined groupings can be based on one or more (if not all) of the newly designated attributes in combination with one or more (if not all) of the predesignated attributes.

Further aspects of the invention provide methods, e.g., as described above, wherein the digital data representing interactions (or "interactional data") includes data representing purchases by one or more first entities from one or more second entities. The first entities can include, in related aspects, any of individuals and/or entities with which they are affiliated (e.g., households, businesses, social or other groups). And, the second entities can include, for example, retailing enterprises. In related aspects, the interactional data includes data representing purchases by the first entities (e.g., distinct households) from the second entity (e.g., the retailer), as well as visits by members of first entities to the second entity's sites in the real or cyber worlds, customer service calls to and/or other customer service contacts with such first entities; mailings to and/or from first entities; and, mass-media marketing campaigns targeting the first entities; among others.

Yet still further aspects of the invention provide methods, e.g., as described above, wherein the predesignated attributes include any of credit card account numbers, email addresses, ship-to addresses, and travel-related mileage account numbers, and wherein the other attributes include any of phone numbers and discount codes.

Still yet further aspects of the invention provide methods, e.g., as described above, wherein any of the predesignated attributes and the other attributes comprise communication device identifiers, e.g., near field communications (NFC) phone IDs.

Further aspects of the invention provide methods, e.g., as described above, wherein the interactional data is from a plurality of sources, including any of databases and/or data streams.

Related aspects of the invention provide methods, e.g., as described above, comprising the further step of utilizing the digital data processing system to identify, from data sources other than the interactional data, information indicating that one or more of the other attributes tend to reliably demarcate the distinct individuals and/or the entities with which they are affiliated. Those other data sources can include, according to aspects of the invention, any of forums, chat rooms, product reviews, other third-party sites on the Internet, and other information in cyberspace. And, the information from them can include, for example, user IDs, message "signature lines," and unusual text strings substantially matching those in the interactional data and tending to identity an entity.

Yet further aspects of the invention provide digital data processing apparatus and systems operating in accord with the methods above.

These and other aspects of the invention are evident in the drawings and in the text that follows.

Detailed Description of the Illustrated Embodiment

FIG. 1 depicts an environment for use of systems, apparatus and methods according to the invention. Here, a plurality of individuals 10 are shown interacting with an enterprise 12 and, more specifically, its physical sites 14, cyberspace sites 16, mail/phone center 18, enterprise offices 20, and/or other public-facing functions, all by way of example.

The entity 12 may be commercial, e.g., a for-profit or nonprofit, a governmental organization, or otherwise—collectively, referred to as "enterprise" occasionally herein and, more often as "entity 12." For sake of simplicity and without limiting the scope of the invention, in the illustrated embodiment, entity 12 is described as a retailer.

Elements 14-20 represent the means through which the entity 12 interfaces with its respective public. For example, in the case of governmental enterprises 12, these may be the public offices, websites, mail/phone centers, agency offices, publication centers, and the like, through which that entity contacts and is contacted by its constituents and/or influencers thereof—e.g., others in household, social, business or other groups with which such constituents are affiliated.

And, by way of further example, in the case of a retailing entity 12, elements 14-20 represent they sites in physical space (e.g. brick and mortar stores 14) and/or cyberspace (e.g. websites 16), mail/phone processing centers 18, and other offices 20, or otherwise, via which the retailer interacts with actual customers, potential customers, and/or influencers thereof (e.g., others in household, social, business or other groups with which such actual or potential customers are affiliated).

Illustrated elements 14-20 are by example only. Entities 12 of other embodiments may have a fewer or greater numbers of these interface functions, which may work with the entity's respective public or constituencies through the same and/or other means. Thus, by way of non limiting example, enterprise offices 20 may include customer service or other such functions. And, they may interface with the enterprise's respective public directly or indirectly via mailings (electronic, print or otherwise) or via media outlets 22, including, by way of non limiting example, newspaper, radio, television, mass mailing, and/or fulfillment centers.

Individuals 10 represent, as noted, the respective "public" of entity 12 and, more particularly, persons or other groups—e.g., households, businesses, social or other groups—interactions with which entity 12 (or another) wishes to track, analyze and/or report. In the drawing, each of those individuals is represented by a stick figure, and the respective group to which each belongs is represented by a graphic of a chimneyed house or building and by a shaded shape 24-28.

In the illustrated embodiment, those groups are households, though, in other embodiments they may be a business, or a social or other group. As further shown in the drawing, some of the individuals 10 are not affiliated with any group per se.

Consistent with the discussion above, each of the individuals 10 interacts with the entity 12 via one or more of its public-facing functions, e.g., its sites in physical space (e.g. brick and mortar stores 14) and/or cyberspace (e.g. websites 16), its mail/phone processing centers 18, other offices 20, and/or other functions. As further shown in the drawings, some of those interactions may be with the entities that represent the respective groups themselves, e.g., interactions such as mailings and deliveries to, or phone calls or web site visits from, the address (in physical or cyberspace) of a household or a building in which a business practices its trade or other group meets. In the discussion that follows the term "public" is used to refer, unless otherwise evident from context, to both the individuals 10 and/or the respective households, businesses, social or other groups 24-28 to which they belong.

Figure 2:
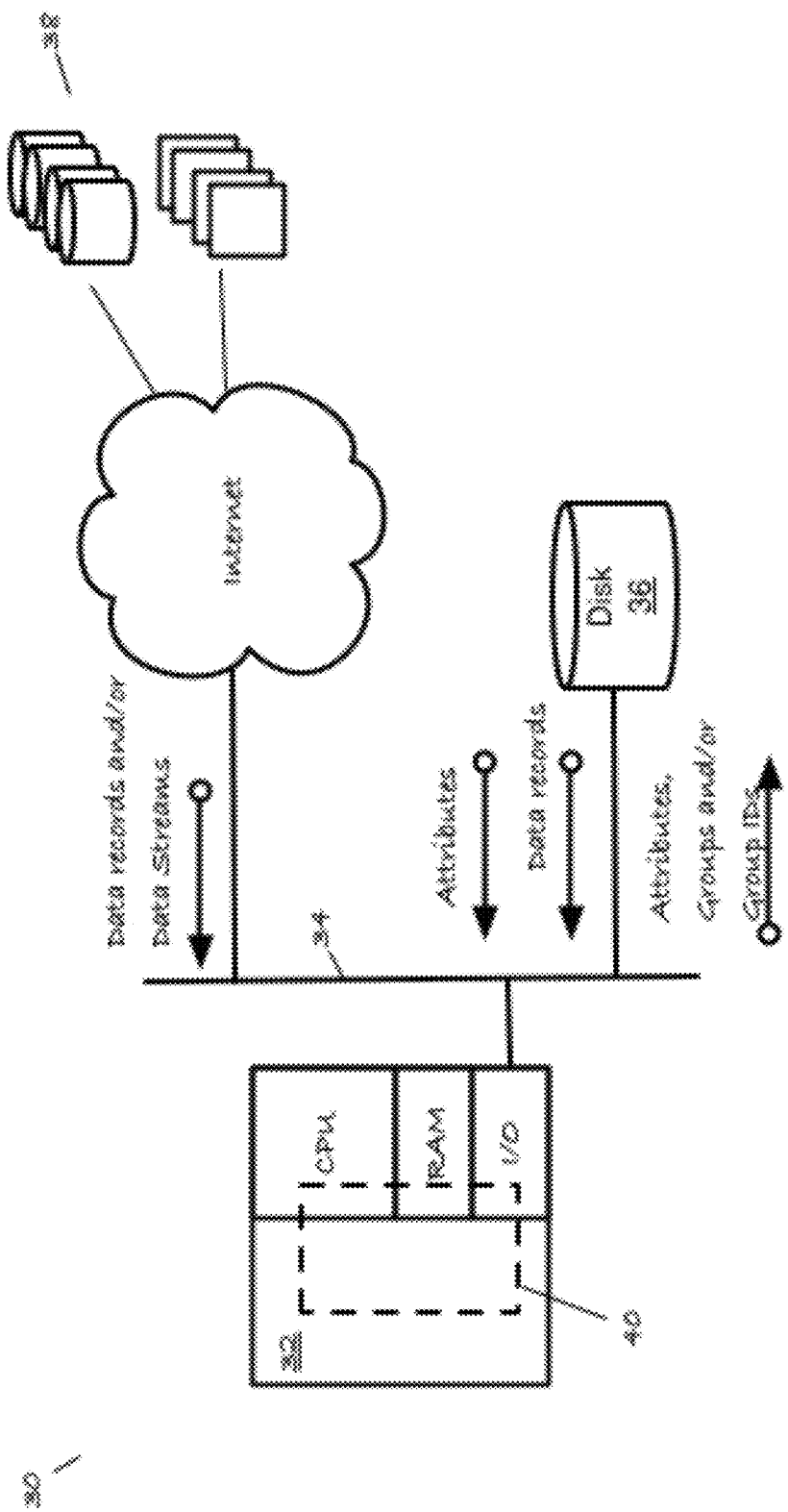
FIG. 2 depicts a digital data processing system according to one practice of the invention for analyzing data records representing interactions between and entity and its public to identify those interactions involving distinct entities.

FIG. 2 depicts a digital data processing system 30 according to one practice of the invention for analyzing data representing such interactions, i.e., between entity 12 and its public 10, to identify those involving distinct individuals and/or the entities with which they are affiliated. For the sake of simplicity, in the illustrated embodiment, those entities are households. In other embodiments, they may be, businesses, social or other groups with which such individuals may be affiliated.

The illustrated system 30 includes digital data processor 32 that is coupled via network 34 for communication with database 36 and with other data sources (e.g., databases, data streams or otherwise) 38.

The digital data processor 32 may be a conventional desktop computer, workstation, minicomputer, laptop computer, tablet computer, PDA or other digital data processing apparatus of the type that is commercially available in the marketplace and that is suitable for operation in the illustrated system as described herein, all as adapted in accord with the teachings hereof. Data processor 32 comprises central processing, memory, storage and input/output units and other constituent components (not shown) of the type conventional in the art that are configured in accord with the teachings hereof to execute application 40—itself comprising functions, subroutines, class instantiations (e.g., with data and method members) and/or other such functionalities that are coupled with one another and with the elements of digital data processor 32 (in the conventional manner in the art as adapted in accord with the teachings hereof) and that are suitable for performing the functions discussed below (and elsewhere herein). Although only a single digital data processor 32 is depicted and described here, it will be appreciated that other embodiments may utilize a greater or fewer numbers of these devices, networked or otherwise, to perform the functions ascribed hereto to application 40, digital data processor 32 and/or the digital data processing system 30.

The central processing, memory, storage and input/output units of client digital data processor 32 may be configured to form and/or may be supplemented by other elements of the type known in the art desirable or necessary to support software application 40 in accord with the teachings hereof, as well as to support other operations of the digital data processor 32. These can include, by way of non-limiting example, peripheral devices (such as keyboards and monitors), operating systems, database management systems, and network interface cards and software, e.g., for supporting communications between digital data processor 32 and other devices over network 34.

Network 34 comprises one or more networks suitable for supporting communications among and between illustrated digital data processor 32 and data sources 36, 38. The network comprises one or more arrangements of the type known in the art, e.g., local area networks (LANs), wide area networks (WANs), metropolitan area networks (MANs), and or Internet(s).

Data sources 36, 38 comprise conventional data bases or other data sources of the type known in the art (albeit configured in accord with the teachings hereof) for retrievably storing and/or streaming for access by digital data processor 32 digital data pertaining to interactions between entity 12 and its public, i.e., individuals 10 and/or the respective households 24-28 to which they belong. That digital data—which may include purchase or other transactional data, records of visits to sites of entity 12 in physical or cyberspace by members of its public, records of mailings between entity 12 and its public, records of mass-media marketing campaigns in newspapers to which such public subscribes or by television, radio, or billboards in his/her area, etc.—is often referred to herein as constituting digital data records (or "records," for short) but may be in any format suitable for processing in accord with the teachings hereof.

Attributes

Regardless of the data record format, each of the interactions represented by the records is typically associated with a plurality of attributes. In the illustrated embodiment, these attributes are of the type conventionally associated with enterprise interaction-related data (including, e.g., financial transaction-related data), e.g., as adapted in accord with the teachings hereof. They may be "fields" or other items contained within or referenced by the records (by pointer, keyword, index, ID, code, or otherwise) and/or they may be implicit to a batch of one or more records.

For example, attributes may implicitly or explicitly reflect characteristics of the entity 12 as well as of a one or more interactions therewith by a member of the entity's public (e.g., that it was an in-person visit to a specified brick-and-mortar site of the entity at a specified date and time, an electronic mailing from a fulfillment center on a specified date in regard to a specified item to be delivered, a purchase of a specified item from a web site at a specified price, and so forth).

The attributes may also implicitly or explicitly reflect characteristics of the individual and/or other entity 10 involved in the transaction. This may include "biographical" information (such as names, addresses, phone numbers), financial information (such as bank or credit card account numbers), and so forth—again, of the type conventionally associated with interaction-related data in the art, e.g., as adapted in accord with the teachings hereof.

Moreover, the attributes may include communication device identifiers, e.g., of the types associated with mobile phones and personal digital assistants (e.g., IMEI identifiers, MAC addresses, and so forth) and with near field communications (NFC) mobile phones and other devices.

One or more of the attributes associated with the interaction data records may be predesignated (e.g., by way of flags associated with the respective fields, by way of default settings in software application 40 or otherwise) as being presumed to reliably characterize distinct individuals and/or the households to which they belong (and/or in other embodiments, the business, social or other groups with which they are affiliated). In some embodiments, those predesignated attributes are credit card account numbers, email addresses, communication device identifiers, and/or air miles (or other travel-related mileage) account numbers, by way of non-limiting example.

Other attributes that may be associated with the interaction data records, but not predesignated as presumed to reliably characterize distinct individuals and/or the households, may include phone numbers, discount codes, and so forth, all by way of non-limiting example.

In addition to attributes made up of fields or other items contained within or referenced by the records are attributes that can be gleaned from those fields or items *based on* information from other sources, i.e., sources other than the interactional data itself. Those other sources—which may include, for example, forums, chat rooms, product reviews, other third-party sites on the Internet—may provide information in the form of user IDs, message "signature lines," and unusual text strings, all by way of non limiting example, that (i) substantially match information in the interactional data, and (ii) thereby tend to the identity of an individual and/or an entity with which he/she is affiliated. As such, that matching information in the interactional data can be treated by systems and methods according to the invention as predesignated attributes or other attributes tending to reliably demarcate the those individuals and entities.

Figure 3:
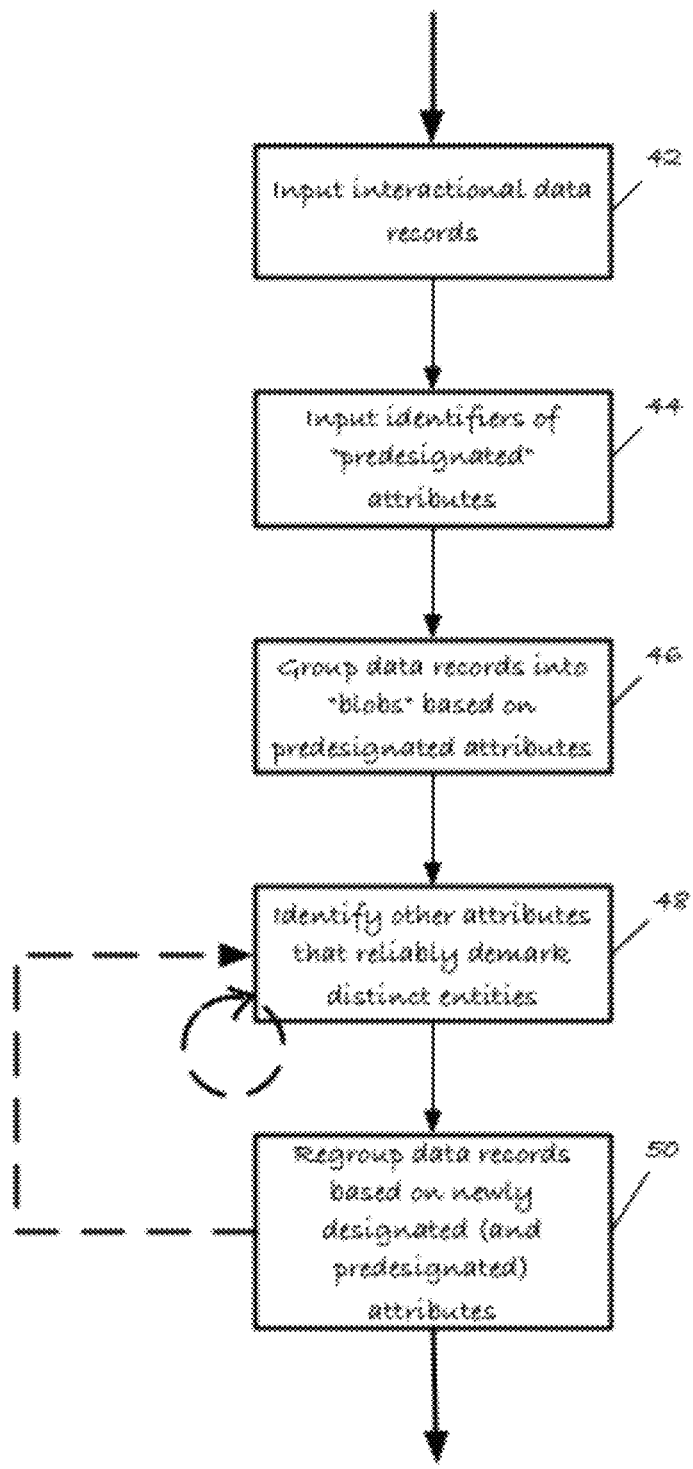
FIG. 3 depicts operation of software application for execution on the digital data processor of FIG. 2.

FIG. 3 depicts operation of software application 40 for processing such data records in order to identify those involving distinct individuals and/or the entities with which they are affiliated. As discussed above, for the sake of simplicity in the illustrated embodiment, those entities are households. In other embodiments, they may be, businesses, social or other groups with which such individuals may be affiliated.

In step 42, the application 40 accepts as input data records representing interactions between and entity 12 and individuals 10. As discussed above, the records may also represent interactions between the entity 12 and one or more households 24-28 to which those individuals belong. The data records may be formatted as discussed previously and may come from one or more sources, e.g., databases and/or data streams. In the illustrated data records are assumed to have been pre-validated in order to eliminate attributes known to be erroneous, e.g., obviously improper phone numbers (e.g., 555-555-5555), unverified or unverifiable email addresses, and so forth.

In step 44, the application 40 accepts, as input, indications of which types of attributes are to be treated as predesignated, i.e., which are presumed to reliably characterize distinct individuals and/or the households to which they belong. In the example that follows, those are email addresses and credit card account numbers. In other examples and embodiments, other attributes may be used instead or in addition. Moreover, in some embodiments, the types of attributes are to be treated as predesignated is preprogrammed into application 40 and/or indicated in other ways, e.g., flags in headers or tables associated with the aforementioned databases and/or data streams.

Still further, in some embodiments, no types of attributes are presumed to reliably characterize distinct individuals and/or the households to which they belong. These embodiments can operate as described below by arbitrarily, statistically or otherwise selecting one or more attribute types from among the input data records and treating it/them as predesignated for purposes of initiating the identification process described below.

In step 46, the application 40 begins a process of identifying so-called newly designated attributes, i.e., attributes of the data records, other than the predesignated ones, which tend to reliably demarcate distinct individuals and/or their respective households. To that end, the application 40 groups the data records into tentative groups, referred to here as "data blobs," based on the predesignated attributes. More specifically, it groups into data blobs those records having or associated with like (or substantially similar) values for any of the predesignated attribute types. For example, in instances where the predesignated attributes are email addresses and credit card account numbers, the application 40 forms into respective data blobs all transactions associated with the same email addresses and/or the same credit card account numbers.

Step 46 may be better understood by reference to FIG. 4, which depicts sample data records 60 associated with respective credit card attributes with values CC1-CC5, phone number attributes with values PN1-PN5, and email address values EM1-EM2, as indicated. In FIG. 4A, those records are shown before grouping step 46 and, in FIG. 4B, after. As illustrated, the step results in formation of data blobs, here, identified by shaded shapes encompassing the respective groupings. To further illustrate how the application 40 makes those groupings, the drawing includes lines connection records with matching values credit card and/or email address values.

In step 48, the application 40 newly designates, from among the other attributes associated with the data records—i.e., among attributes other than the predesignated ones—those tending, de facto, to reliably demarcate distinct individuals and/or the households to which they belong. To that end, the application 40 identifies, among those other attributes, those whose quantitative usage among the data blobs does not exceed a first threshold measure and within the data blobs does not fall below a second threshold measure.

The application 40 can iterate through all of those other attributes (and/or attribute types) associated with the data records or, in some embodiments, selected ones of those other attributes (and/or types), e.g., as specified by default in application 40, as specified in step 44 (along with the indications of types of attributes to be treated as predesignated), or as otherwise specified. The discussion below illustrates execution of step 48 with respect to data blobs and data records of the type shown in FIG. 4B and, specifically, with respect to determination of which phone number attributes (or, put another way, which values of the type phone number) are suitable for such designation. Attributes of other types associated with the data records can be similarly processed—instead and/or in addition.

First Threshold Measure

In the illustrated embodiment, that first measure is a count (or index) of the number of data blobs in which each of those other attributes appear. For example, in the case of a phone number attribute, that first measure is a count of the number of data blobs in which any particular phone number value appears; in the case of a discount code attribute index, a count of the number of data blobs in which any particular discount code value appears; and so forth.

Referring to the data blobs of FIG. 4B, for example, the phone number attribute index of value PN1 is 1; PN2 is 1; PN3 is 3; PN4 is 1; and PN5 is 1. Generally speaking, higher index values suggest false or erroneous data. For example, if the records of FIG. 4 represent purchase transactions, the fact that PN3 appears in three different data blobs—and, therefor by implication, in the data records of transactions for three different individuals or their respective households—suggests that the value PN3 was incorrectly (and, perhaps, fraudulently) entered by a cashier, a mail/phone order taker, or so forth.

In order to detect such instances, the illustrated embodiment utilizes a low threshold for the first measure, here, the phone number attribute index. That threshold can be, for example, the value one, so that any phone number attributes that appears in two or more data blobs that are defined by credit card and/or email addresses is disregarded as a possible newly designated attributes that reliably demarcate distinct individuals and/or the households to which they belong.

Other embodiments may use different values for this and for thresholds for other attributes or attribute types. For example, in instances where data blobs are defined merely by credit card number, higher values of the phone number attribute index threshold may be appropriate since, for example, an index of 1 may reflect transactions by a household that consistently uses one credit card and home phone number for every transaction; 2, a household in which the two parents shop with two different credit cards but using the same home number; 4, a household with four different credit cards but using the same home number. However, an index of 10 seems implausible under most reasonable scenario.

Second Threshold Measure

In the illustrated embodiment, the second measure is a quantitative measure of reliability of the type of a given attribute in any data blobs in which the specific attribute appears. For example, in the case of a phone number attribute, that second measure is the maximum ratio, in any blob in which a specific phone number appears, of the number of distinct phone numbers in that blob to the number of distinct combination of predesignated attributes associated with the records of that blob. That maximum ratio is referred to here, for convenience, as the blob diversity of the phone number attribute.

By way of further example, in the case of a discount code attribute, that second measure is the discount code blob diversity, i.e., the maximum ratio, in any blob in which a specific discount code attribute appears, of the number of distinct discount codes in that blob to the number of distinct combinations of predesignated attributes associated with the records of that blob.

Referring to the data blobs of FIG. 4B, for example, the diversity of the phone number attribute PN1 is 1, i.e., the maximum of

- 3/3 (the number of distinct phone numbers in the upper-left blob divided by the number of distinct combination of the predesignated attributes associated with the records of that same blob)
- 3/3 (the number of distinct phone numbers in the upper-right blob divided by the number of distinct combination of the predesignated attributes with the records of that same blob)
- 1/1 (the number of distinct phone numbers in the bottom-most blob divided by the number of distinct combination of the predesignated attributes associated with the records of that same blob)

Likewise, by way of further example, the diversity of the phone number attribute PN2 is 1 or 3/3 (the number of distinct phone numbers in the only blob in which PN2 appears divided by the number of distinct combination of the predesignated attributes associated with the records of that same blob).

Generally speaking, higher blob diversity values suggest false or erroneous data. For example, for purchase transaction records of the type shown in FIG. 4, a phone number attribute with a high diversity would be suggestive of an individual or household that is fabricating phone numbers for use with each transaction.

In order to detect such instances, the illustrated embodiment utilizes a low threshold for the second measure, here, the phone number attribute blob diversity. For example, in instances where data blobs are defined by credit card number and email address, a blob diversity of 1 may reflect transactions by a household in which a single parent uses one credit card only and consistently provides one email address and home phone number; 1/2, a household in which the two parents shop with two different credit cards but provide the same email address and home phone; 3/2, a household in which the two parents shop with the same credit card, but provide two separate email addresses and their cell phone numbers, yet, occasionally provide their home number. However, an index of 10 seems implausible under most reasonable scenario.

Information from Other Sources Suggesting Attributes

Execution of step 48 can include searching forums, chat rooms, product reviews, other sites on the Internet, and other sources other than the data records themselves, for information from which additional attributes may be gleaned from the data records. To this end, application 40 can parse web pages and other stored (or streamed) information from such sources to identify user IDs, message "signature lines," and unusual text strings that match text or other data contained in the interactional data. Upon finding an exact or substantial match, the application can treat the matching information as an attribute for processing in accord with the discussion above to discern whether it tends to reliably demarcate an those individuals and/or entity with which he or she is affiliated.

Regrouping Data Records

Turning back to FIG. 3, in step 50 the application 40 re-groups the data into refined data blobs based on at least one of the newly designated attributes and, typically, based on the combination of predesignated attributes and newly defined attributes. More specifically, it groups into refined data blobs those records having or associated with like (or substantially similar) values for any of those attributes. For example, in instances where the predesignated attributes are email addresses and credit card account numbers, and where some phone numbers were identified and designated in step 48 as tending to reliably demarcate distinct individuals and/or their households, the application 40 forms into respective refined blobs all transactions associated with the same email addresses and/or the same credit card account numbers and/or those newly designated phone numbers.

As noted above, the application 40 can iterate through all attributes (and/or attribute types) associated with the data records or selected ones of those attributes and/or types, e.g., as specified by default or otherwise. Thus, for example, the application can identify and designate attributes of the type "phone number" (or, more simply put, it can identify specific phone numbers) that reliably demarcate distinct individuals and/or the households to which they belong. Or, by way of further example, it can identify attributes of the types "phone number" and "travel-related mileage account number" that so demarcate such individuals and/or the households. To this end, the application can repeat step 48 for each such type, e.g., utilizing the blobs initially created in step 46 or, alternatively, it can iterate through respective types utilizing refined groupings formed in step 50—both of which alternatives are indicated by dashed lines in the drawing.

Instead of or in addition to formally regrouping the records as described above in connection with step 50, the application can assign a common "entity" ID, "household" ID or some other unique value to each of the records that would make up the refined data blobs. Those ID or other values can be transmitted to downstream software, along with the records to which they are assigned, for tracking, further analysis and/or reporting activity by the individual's and/or households or other entities with which they are associated.

Described above are systems, apparatus and methods meeting the aforesaid objects, among others. It will be appreciated that the embodiments discussed here and shown in the drawings are merely examples of the invention, and that other embodiments incorporating changes therein fall within the scope of the invention, of which we claim:

In view of the forgoing, what we claim is:

1. A method of digital data processor-based analysis of digital data that represent interactions to identify distinct individuals and/or the entities with which they are affiliated, the method comprising the steps of:

A) with a digital data processing system, grouping data representing a plurality of interactions into tentative groups ("data blobs") based on one or more predesignated attributes, and B) with the digital data processing system, analyzing the digital data to identify and to newly designate, as attributes that are alone and/or in combination with each other and/or the predesignated attributes indicative of distinct individuals and/or the entities with which they are affiliated, one or more other attributes (i) whose quantitative usage among the data blobs does not in fact exceed a first threshold measure, and (ii) which are of a type for which a quantitative measure of reliability does not in fact exceed a second threshold measure in any data blobs in which the one or more other attributes appear, C) with the digital data processing system, re-grouping interactions represented by the digital data into refined groups based on (i) one or more of those newly designated attributes and (ii) zero or more predesignated attributes, D) where the quantitative usage of an attribute among the data blobs is any of a count and an index of a number of data blobs in which that attribute appears, and where the quantitative measure of reliability of the type of a given attribute in a given data blob is a ratio, in that given data blob, of a count of distinct attributes of that type in that blob to a count of distinct combinations of the predesignated attributes in that blob.

2. The method of claim 1, wherein
the digital data includes data representing at least purchases by one or more first entities from one or more second entities, and
the first entities include any of individuals, households, business, social groups or other entities,
the second entities include retailing enterprises.

3. The method of claim 2, wherein the digital data includes digital data representing purchases by distinct households from a retailer.

4. The method of claim 2, wherein the digital data includes data representing (a) purchases by distinct households from a retailer, and further representing (b) one or more of visits by members of such households to the retailer's sites in the real or cyber worlds, customer service calls to and/or other customer service contacts with the households; mailings to and/or from the households; and, mass-media marketing campaigns targeting the households.

5. The method of claim 2, wherein
the predesignated attributes include any of credit card account numbers, email addresses, ship-to addresses, and travel-related mileage account numbers,
the other attributes include any of phone numbers, discount codes, and ship-to addresses.

6. The method of claim 2, wherein any of the predesignated attributes and the other attributes comprise communication device identifiers.

7. The method of claim 6, wherein any of the predesignated attributes and the other attributes comprise near field communications device identifiers.

8. The method of claim 1, wherein the digital data is from a plurality of sources, including any of databases and/or data streams.

9. The method of claim 1, comprising the further step of:
with the digital data processing system identifying, from data sources other than the digital data, characteristics of entities suitable as at least one of (a) other attributes and (b) other attributes indicative of distinct individuals and/or the entities with which they are affiliated.

10. The method of claim 9, wherein the data sources other than the digital data include any of forums, chat rooms, product reviews, other third-party sites on the Internet, and other information in cyberspace.

11. The method of claim 9, wherein the characteristics include information indicative of an identity of an entity.

12. The method of claim 9, wherein the characteristics include user IDs, message "signature lines," and unusual text strings substantially matching those in the digital data.

13. A non-transitory computer readable medium containing computer-executable instructions that when executed perform the following steps:
   A) with a digital data processing system, grouping a plurality of interactions represented by the digital data into tentative groups ("data blobs") based on one or more predesignated attributes,
   B) with the digital data processing system, analyzing the digital data to identify and to newly designate, as attributes that are —alone and/or in combination with each other and/or the predesignated attributes —indicative of distinct individuals and/or the entities with which they are affiliated, one or more other attributes (i) whose quantitative usage among the data blobs does not in fact exceed a first threshold measure, and (ii) which are of a type for which a quantitative measure of reliability does not in fact exceed a second threshold measure in any data blobs in which the one or more other attributes appear,
   C) with the digital data processing system, re-grouping interactions represented by the digital data into refined groups based on (i) one or more of those newly designated attributes and (ii) zero or more predesignated attributes, and
   D) where the quantitative usage of an attribute among the data blobs is any of a count and an index of a number of data blobs in which that attribute appears, and where the quantitative measure of reliability of the type of a given attribute in a given data blob is a ratio, in that given data blob, of a count of distinct attributes of that type in that blob to a count of distinct combinations of the predesignated attributes in that blob.

14. The method of claim 13, wherein
   the digital data includes data representing at least purchases by first entities from a second entity, and
   the first entities include any of individuals, households, business, social groups or other entities,
   the second entities include retailing enterprises.

15. The method of claim 14, wherein the digital data includes data representing purchases by distinct households from a retailer.

16. The method of claim 14, wherein the digital data includes data representing (a) purchases by distinct households from a retailer, and further representing (b) one or more of visits by members of such households to the retailer's sites in the real or cyber worlds, customer service calls to and/or other customer service contacts with the households; mailings to and/or from the households; and, mass-media marketing campaigns targeting the households.

17. The method of claim 14, wherein
   the predesignated attributes include any of credit card account numbers, email addresses, ship-to addresses, and travel-related mileage account numbers,
   the other attributes include any of phone numbers, discount codes, and ship-to addresses.

18. The method of claim 14, wherein any of the predesignated attributes and the other attributes comprise communication device identifiers.

19. The method of claim 18, wherein any of the predesignated attributes and the other attributes comprise near field communications device identifiers.

20. The method of claim 13, wherein the digital data is from a plurality of sources, including any of databases and/or data streams.

21. The method of claim 13, wherein step (C) comprises the step of:
   with the digital data processing system, assigning identifiers to the refined groups.

22. The method of claim 13, comprising the further step of:
   with the digital data processing system, identifying, from data sources other than the digital data, characteristics of entities suitable as at least one of (a) other attributes and (b) other attributes indicative of distinct individuals and/or the entities with which they are affiliated.

23. The method of claim 22, wherein the data sources other than the digital data include any of forums, chat rooms, product reviews, other third-party sites on the Internet, and other information in cyberspace.

24. The method of claim 23, wherein the characteristics include information indicative of an entity.

25. The method of claim 23, wherein the characteristics include user IDs, message "signature lines," and unusual text strings substantially matching those in the digital data.

26. A digital data processing system for analysis of digital data that represent interactions to identify distinct individuals and/or the entities with which they are affiliated, the system comprising a hardware digital data processor executing:
   A) first functionality that groups data representing a plurality of interactions into tentative groups ("data blobs") based on one or more predesignated attributes, and
   B) second functionality that is coupled with the first functionality and that analyzes the digital data to identify and to newly designate, as attributes that are—alone and/or in combination with each other and/or the predesignated attributes—indicative of distinct individuals and/or the entities with which they are affiliated, one or more other attributes (i) whose quantitative usage among the data blobs does not exceed a first threshold measure, and (ii) which are of a type for which a quantitative measure of reliability does not exceed a second threshold measure in any data blobs in which the one or more other attribute appear,
   C) with third functionality that is coupled to the second functionality, re-grouping interactions represented by the digital data into refined groups based on (i) one or more of those newly designated attributes and (ii) zero or more predesignated attributes, and
   D) where the quantitative usage of an attribute among the data blobs is any of a count and an index of a number of data blobs in which that attribute appears, and where the quantitative measure of reliability of the type of a given attribute in a given data blob is a ratio, in that given data blob, of a count of distinct attributes of that type in that blob to a count of distinct combinations of the predesignated attributes in that blob.

* * * * *